(12) United States Patent
Kono et al.

(10) Patent No.: US 10,559,833 B2
(45) Date of Patent: Feb. 11, 2020

(54) FUEL CELL STACK

(71) Applicant: TOYOTA JIDOSHA KABUSHIKI KAISHA, Toyota-shi, Aichi-ken (JP)

(72) Inventors: Takashi Kono, Tajimi (JP); Masao Igarashi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 57 days.

(21) Appl. No.: 16/004,657

(22) Filed: Jun. 11, 2018

(65) Prior Publication Data

US 2018/0366742 A1 Dec. 20, 2018

(30) Foreign Application Priority Data

Jun. 15, 2017 (JP) .................. 2017-118030

(51) Int. Cl.
| | |
|---|---|
| *H01M 8/0226* | (2016.01) |
| *H01M 8/0228* | (2016.01) |
| *H01M 8/0208* | (2016.01) |
| *H01M 8/2465* | (2016.01) |

(52) U.S. Cl.
CPC ....... *H01M 8/0228* (2013.01); *H01M 8/0208* (2013.01); *H01M 8/2465* (2013.01)

(58) Field of Classification Search
CPC . H01M 8/0228; H01M 8/0208; H01M 8/2465
See application file for complete search history.

(56) References Cited

U.S. PATENT DOCUMENTS

| | | |
|---|---|---|
| 9,093,672 B2 | 7/2015 | Suzuki et al. |
| 2004/0202909 A1 | 10/2004 | Knights et al. |
| 2006/0093889 A1 | 5/2006 | Bisaka |
| 2016/0141633 A1 | 5/2016 | Kanno et al. |
| 2016/0211543 A1 | 7/2016 | Okabe et al. |
| 2016/0329577 A1 | 11/2016 | Shizuku |

FOREIGN PATENT DOCUMENTS

| | | |
|---|---|---|
| JP | 2005-293874 | 10/2005 |
| JP | 2005-293876 | 10/2005 |
| JP | 2007-294245 | 11/2007 |
| JP | 2008-059874 A | 3/2008 |
| JP | 2008-153082 A | 7/2008 |
| JP | 2008-293668 | 12/2008 |
| JP | 2015-69737 | 4/2015 |
| JP | 2016-96033 | 5/2016 |

*Primary Examiner* — Helen Oi K Conley
(74) *Attorney, Agent, or Firm* — Finnegan, Henderson, Farabow, Garrett & Dunner, LLP

(57) ABSTRACT

Provided is a fuel cell stack including a plurality of stacked cells each having separators, in which the corrosion (dissolution) of the base material of each separator used for the end cell, which includes one or more cells located at the positive-side end of the fuel cell stack, can be prevented at low cost and without the productivity decreased. In the fuel cell stack including a plurality of stacked cells each having separators, the base material of each of the separators used for the end cell located at the positive-side end of the fuel cell stack and the base material of each of the separators used for the other cells are different metallic materials, and the base material (e.g., Ti) of each of the separators used for the end cell has higher corrosion resistance than the base material (e.g., SUS) of each of the separators used for the other cells.

7 Claims, 9 Drawing Sheets

FUEL CELL STACK

CROSS REFERENCE TO RELATED APPLICATIONS

The present application claims priority from Japanese patent application JP 2017-118030 filed on Jun. 15, 2017, the content of which is hereby incorporated by reference into this application.

BACKGROUND

Technical Field

The present disclosure relates to a fuel cell stack.

Background Art

As one of the environmentally friendly power sources, a fuel cell is often used. For example, a polymer electrolyte fuel cell mainly includes a membrane electrode assembly (MEA) that includes an electrolyte membrane with catalyst layers sandwiching opposite surfaces thereof, gas diffusion layers provided on opposite outer sides of the catalyst layers, and a pair of separators sandwiching the entire boy from the right and left sides thereof. A plurality of such cells are stacked while being electrically connected in series, so that the fuel cell stack is formed.

When a fuel cell generates power, the cell is exposed to a corrosive environment. Therefore, SUS with excellent corrosion resistance is typically used as the base material of each separator of the cell. However, when the potential of the cell becomes high (greater than or equal to about 1 V) in the corrosive environment, the metal would unavoidably dissolve. This is because cooling water for the fuel cells flows through the fuel cell stack such that the water contacts every cell. Therefore, an equivalent circuit is formed as described below. In addition, since the cells in the fuel cell stack are arranged in series, the voltage becomes high and a large corrosion current flows through a plurality of cells located at the positive-side end of the fuel cell stack, and thus the potential therein becomes high. Consequently, corrosion (dissolution) occurs in the base materials of the separators (For example, SUS). It should be noted that in the present disclosure, "corrosion" or "dissolution" means a state in which a metallic material is ionized and thus dissolves so that the plate thickness decreases.

Measures for preventing such corrosion (dissolution) of the base materials of the separators have been proposed. For example, JP 2005-293876 A describes a fuel cell stack formed by stacking a plurality of unit cells each having metal separators of the same type, obtained by applying surface treatment to the metal separators of one or more cells located at the positive-side end of the fuel cell stack by which the corrosion resistance of the metal separators becomes relatively higher than those of the metal separators used for the other cells. As the surface treatment for providing high corrosion resistance, a plating process that uses noble metal, such as gold or silver, or a plating process that forms thick plating are exemplarily illustrated, and as the surface treatment for providing low corrosion resistance, a plating process that forms thinner plating is exemplarily illustrated.

JP 2005-293874 A describes a fuel cell stack with a configuration in which a pair of terminal plates are arranged at opposite ends of a cell stack having a plurality of stacked unit cells, in which fluid channels for supplying or discharging reactant gas and cooling water to/from the cell stack are allowed to communicate with only an inlet port and an outlet port that penetrate the negative-side terminal plate. That is, since oxidation current flows through the positive-side terminal plate, the cell stack is configured such that the cooling water or moisture of reactant gas flowing through the fluid channels does not contact the positive-side end plate, whereby an improvement in the corrosion resistance of the positive-side terminal plate and cost reduction are achieved. JP 2005-293874 A also discloses arranging a cutoff plate for cutting off moisture permeation between the positive-side terminal plate and the cell stack.

In addition, JP 2015-69737 A describes a configuration of a fuel cell stack including power-generating cells and a non-power-generating dummy cell(s), in which the dummy cell is arranged at one or each end of the plurality of stacked power-generating cells. Using a dummy cell can suppress flatting at one or each end of the cells in the stacked direction and a voltage drop due to contamination.

SUMMARY

In the fuel cell stack described in JP 2005-293876 A, surface treatment for providing higher corrosion resistance (for example, a plating process that uses noble metal, such as gold or silver, or a plating process that can form a thicker film) is performed on the metal separators of the end cell(s) located at the positive-side end of the fuel cell stack, so as to prevent the corrosion (dissolution) of the metal separators of the end cell(s) located at the positive-side end of the fuel cell stack, so that the life of the fuel cell stack can be prolonged. However, in order to effectively prevent the corrosion of the metal separators, a plating process that can form a film with a thickness on the order of μm would be required. In addition, performing a plating process for forming a thick film using metal, such as gold or silver, as a postprocess may often increase the cost and decrease the productivity.

The fuel cell stack described in JP 2005-293874 A is effective for increasing the corrosion resistance of the positive-side terminal plate. However, JP 2005-293874 A does not describe preventing the corrosion of the metal separators of the end cell(s) located at the positive-side end of the fuel cell stack.

The present disclosure has been made in view of the foregoing circumstances. Exemplary embodiments relate to providing a fuel cell stack including a plurality of stacked cells each having separators, in which the corrosion (dissolution) of the base material of each of separators used for an end cell, which includes one or more end cells located at the positive-side end of the fuel cell stack, can be prevented at a lower cost without decreasing the productivity.

A fuel cell stack in accordance with the present disclosure is a fuel cell stack including a plurality of stacked cells each having separators, in which the base material of each of separators used for an end cell located at the positive-side end of the fuel cell stack and the base material of each of separators used for cells other than the end cell are different metallic materials, and the base material of each of the separators used for the end cell is a material with higher corrosion resistance than the base material of each of the separators used for the cells other than the end cell.

As described above, "corrosion" as referred to in the present disclosure means a state in which a metallic material that is the base material of a separator is ionized and thus dissolves, with the result that the plate thickness decreases.

In the fuel cell stack formed of a plurality of cells, only the base material of each of the separators of the end cell in which corrosion of the separator is likely to occur is a material with higher corrosion resistance than that of the base material of each of the separators used for the other cells, whereby the production cost can be reduced in comparison with when the base materials of the separators of all of the cells are high-cost materials with high corrosion resistance.

In the fuel cell stack in accordance with the present disclosure, the end cell may be a single cell located at the outermost end on the positive side of the fuel cell stack, or one or more cells including such cell and its adjacent cell(s). It would be practical to detect up to which cell counted from the positive-side end of the fuel cell stack is likely to have significant corrosion generated therein during power generation through experiments or simulation, and determine such cell(s) as the "end cell."

In the fuel cell stack in accordance with the present disclosure, all of the cells are preferably cells that contribute to power generation. It is also possible to use a "dummy cell" such as the one described in JP 2015-69737 A as one of the end cells, but using cells that contribute to power generation for all of the end cells can obtain sufficient power even when the size of the fuel cell stack is reduced.

In the fuel cell stack in accordance with the present disclosure, the base material of each of the separators used for the end cell may have a passivation film formed on its surface. The passivation film may be formed naturally as the base material of the separator is left in the natural environment or may also be formed artificially. As the former base material, Ti, Sn, Ta, and the like are given as examples. Such base material can surely provide higher corrosion resistance due to the passivation film formed on its surface.

In the fuel cell stack in accordance with the present disclosure, a material that will not corrode even when it has no passivation film formed thereon may also be used as the material with higher corrosion resistance. Examples of such material include noble metal such as Au, Pt, or Ag. However, such noble metal is expensive and is disadvantageous in terms of cost. Accordingly, using Ti, Sn, Ta, or the like that has a passivation film formed thereon as the base material, in particular, Ti is extremely effective in terms of cost.

As a separator having a passivation film formed thereon, it is more preferable to use a configuration in which a surface of the passivation film has formed thereon a surface protective layer having a thickness in the range of 5 nm to 500 nm and capable of further enhancing the corrosion resistance. As an example of such a surface protective layer, a plated layer of NiSn or Au can be used. In the separator with such a configuration, as the passivation film is formed on the surface of the base material of the separator, given corrosion resistance is already provided, and thus expected performance can be fully achieved even when the thickness of the surface protective layer that is further formed on the surface of the passivation film is as thin as 5 nm to 500 nm. Further, even when expensive noble metal such as Au is used, the thickness of the resulting plating is on the order of nm. Therefore, cost reduction and enhancement of the productivity are achieved in comparison with when the conventional plated layer with a thickness on the order of μm is formed.

According to the fuel cell stack in accordance with the present disclosure that includes a plurality of stacked cells each having separators, the corrosion (dissolution) of the base material of each of the separators used for the end cell, which includes one or more cells located at the positive-side end of the fuel cell stack, can be prevented at low cost and without the productivity decreased.

DETAILED DESCRIPTION

Hereinafter, embodiments for carrying out the present disclosure will be described with reference to the drawings. First, a reason that corrosion occurs in some of separators of cells on the positive side of a fuel cell stack will be described with reference to FIGS. 1 and 2.

Figure 1A:
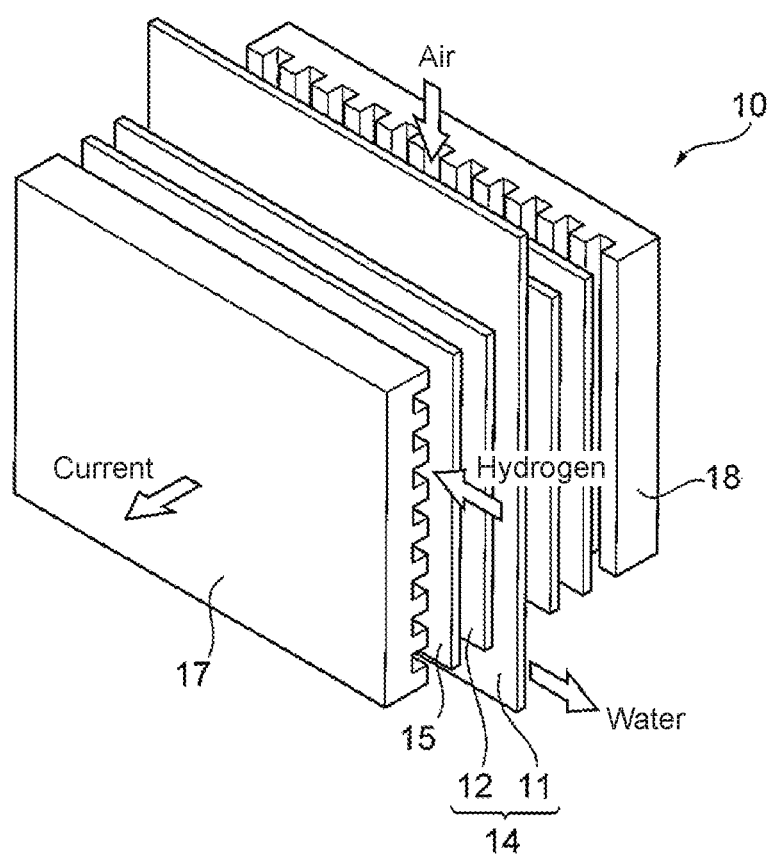
FIGS. 1A and 1B are a schematic perspective view and a side view for illustrating a fuel cell, respectively.
Figure 1B:
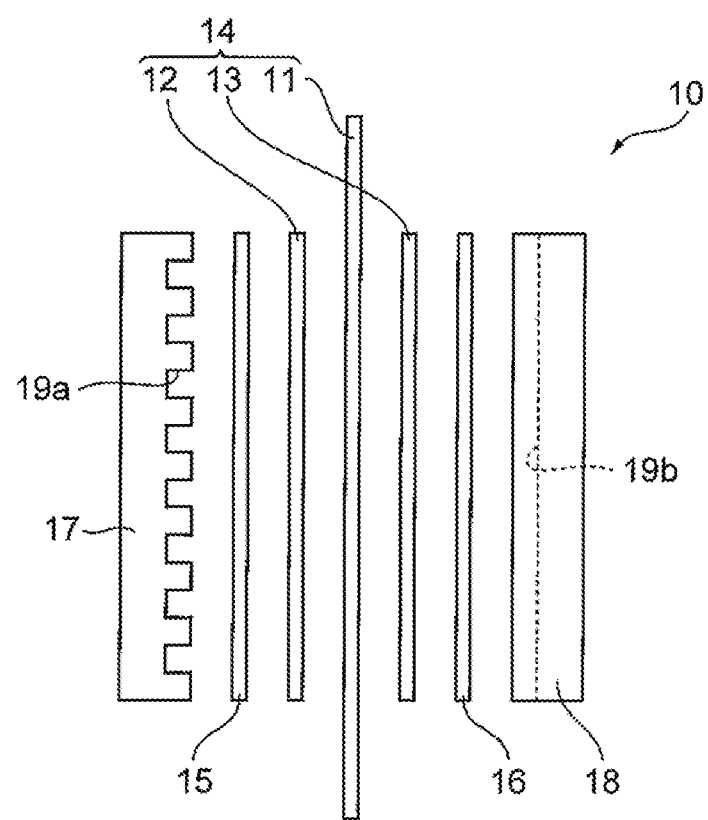

FIG. 1 are a schematic perspective view (FIG. 1A) and a side view (FIG. 1B) illustrating an example of a power-generating cell of a fuel cell stack, respectively. In this example, a power-generating cell 10 is a solid polymer power-generating cell, and the power-generating cell 10 includes a membrane electrode assembly 14 that includes an electrolyte membrane 11, an electrode (an anode-side catalyst layer 12) arranged on one of surfaces of the electrolyte membrane 11, and an electrode (a cathode-side catalyst layer 13) arranged on the other surface of the electrolyte membrane 11; diffusion layers 15 and 16 located on opposite side surfaces of the membrane electrode assembly 14; and a pair of separators 17 and 18 sandwiching the two diffusion layers 15 and 16 from the outer sides thereof. In the example illustrated in the drawings, flow channels 19a and 19b are formed on sides of the separators 17 and 18 facing the diffusion layers 15 and 16, respectively, and hydrogen gas as fuel gas is sent to one of the flow channels 19a, while air as oxidant gas is sent to the other flow channel 19b. Then, the power-generating cell 10 generates heat through power-generation action and also generates water.

Figure 2A:
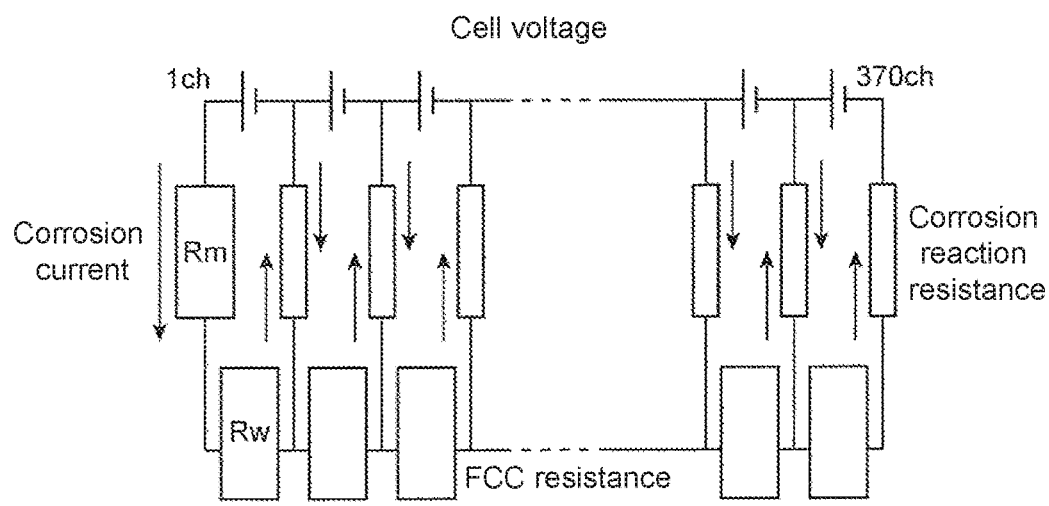
FIGS. 2A, 2B, and 2C are views illustrating a reason that corrosion occurs in separators of an end cell of a fuel cell stack.

The fuel cell stack includes a plurality of such power-generating cells 10 that are stacked while being electrically connected in series, and the fuel cell stack is provided with a flow channel for circulating cooling water via a manifold formed in each power-generating cell to cope with the generation of heat during power generation. Cooling water (FCC) contacts all the power-generating cells in the fuel cell stack, and the cooling water (FCC) becomes a solvent so that an equivalent circuit such as the one illustrated in FIG. 2A is formed. It should be noted that in the example illustrated in FIG. 2A, 370-ch power-generating cells form a fuel cell stack.

Figure 2B:
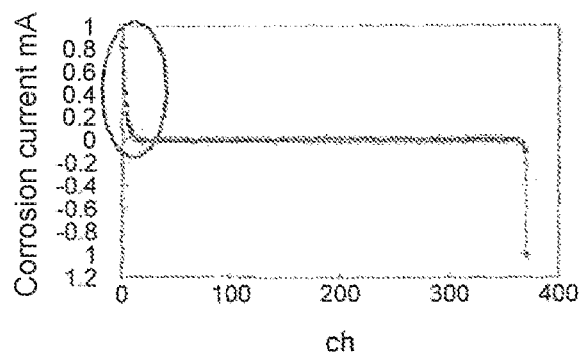
Figure 2C:
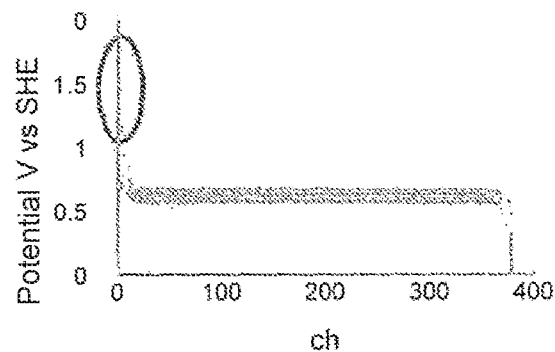

FIGS. 2B and 2C illustrate the distributions of a current and a potential in each power-generating cell of such a fuel cell stack, respectively. In the fuel cell stack, the power-generating cells 10 are arranged in series as described above, and a large current flows as a corrosion current on the positive side as illustrated in FIG. 2B, and thus the potential therein becomes high as illustrated in FIG. 2C. Therefore, in the fuel cell stack, a corrosion phenomenon in which a metallic material is ionized and thus dissolves is likely to occur in the separators of the plurality of power-generating cells on the positive side (hereinafter referred to as "end cells") at a potential of above 1 V.

In order to avoid such corrosion in the fuel cell stack described in JP 2005-293876 A in which all of the power-generating cells have separators made of the same metal, a plating process that uses noble metal is applied to the separators of the end cell(s) on the positive side. Therefore, it is concerned that the production cost may increase and the productivity may deteriorate as described above.

Figure 3:
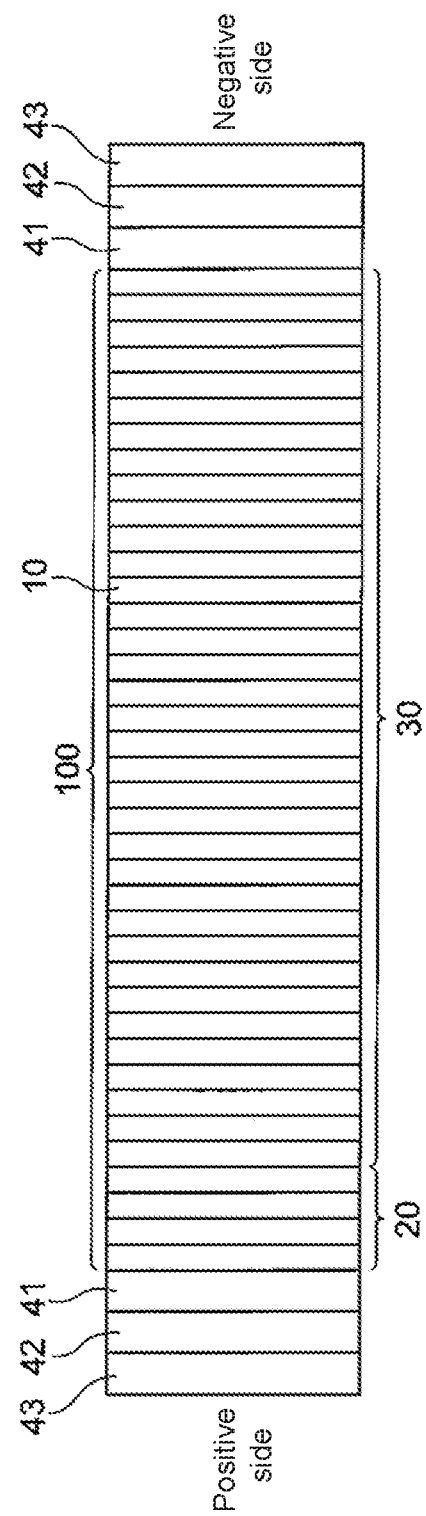
FIG. 3 is a schematic view illustrating an example of a fuel cell stack in accordance with the present disclosure.

The fuel cell stack in accordance with the present disclosure prevents such corrosion of the separators of the end cell(s) on the positive side based on a different method from that of JP 2005-293876 A. This is specifically described below. FIG. 3 is a schematic view illustrating an example of a fuel cell stack in accordance with the present disclosure. Basically, a fuel cell stack 100 includes a plurality of power-generating cells 10. Each power-generating cell 10 may be a power-generating cell with the configuration illustrated in FIG. 1, but has a different configuration from the conventional fuel cell stack such as the one described in JP 2005-293876 A in that metallic materials of separators 17a and 18a of one or more cells located at the outermost end on the positive side of the fuel cell stack 100 (in the example in FIG. 3, four cells counted from the positive side; hereinafter referred to as "end cells 20") and metallic materials of separators 17b and 18b of cells 30 other than the end cells are different metallic materials.

It should be noted that a pair of terminal plates 41, 41 for extracting power are usually arranged on the positive side and the negative side of the fuel cell stack 100, and a pair of end plates 43, 43 are arranged on the outer sides of the terminal plates 41, 41 with insulating plates 42, 42 interposed therebetween, and further, the entire fuel cell stack is compressed.

Figure 4:
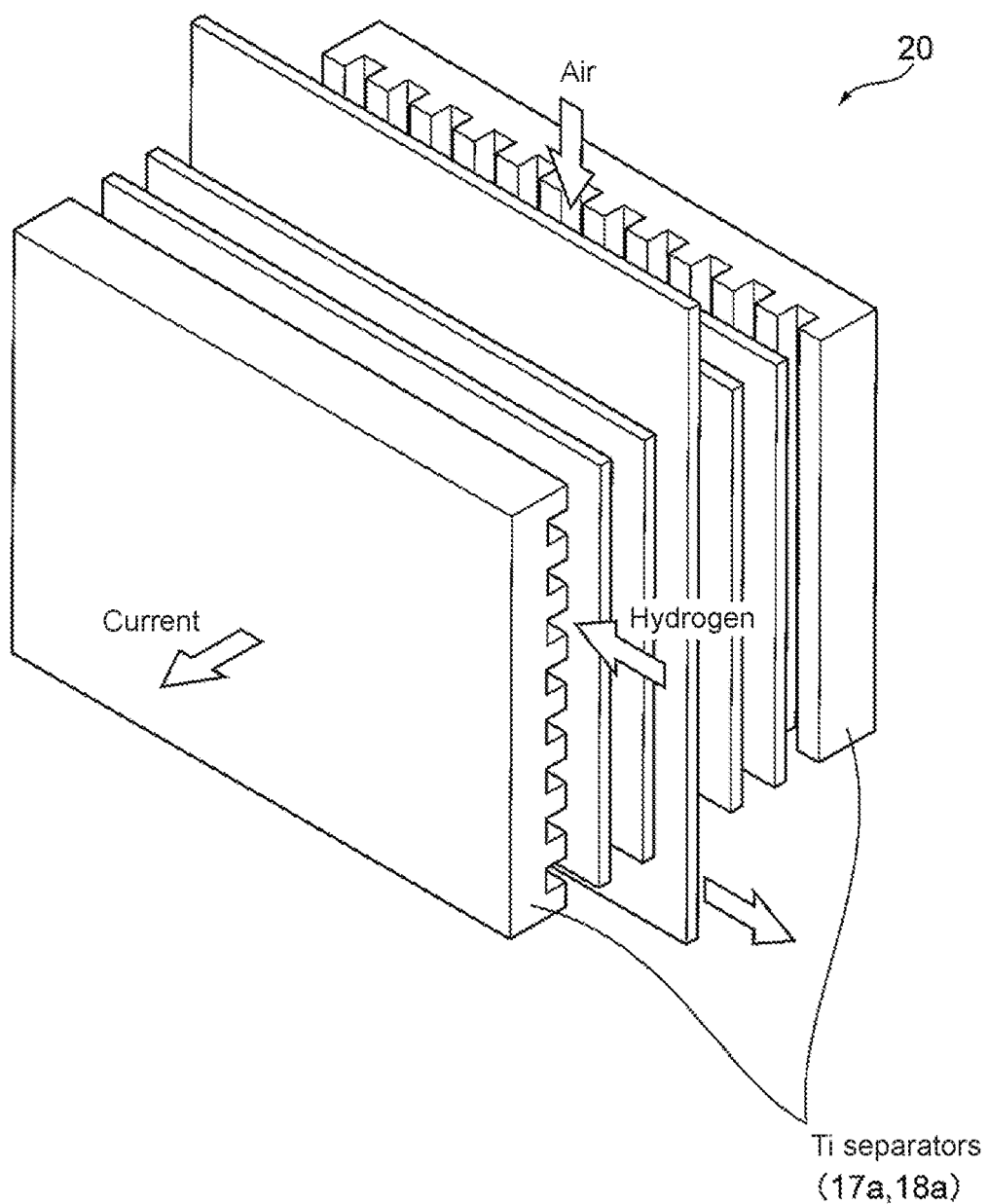
FIG. 4 is a schematic perspective view illustrating the configuration of an end cell.
Figure 5:
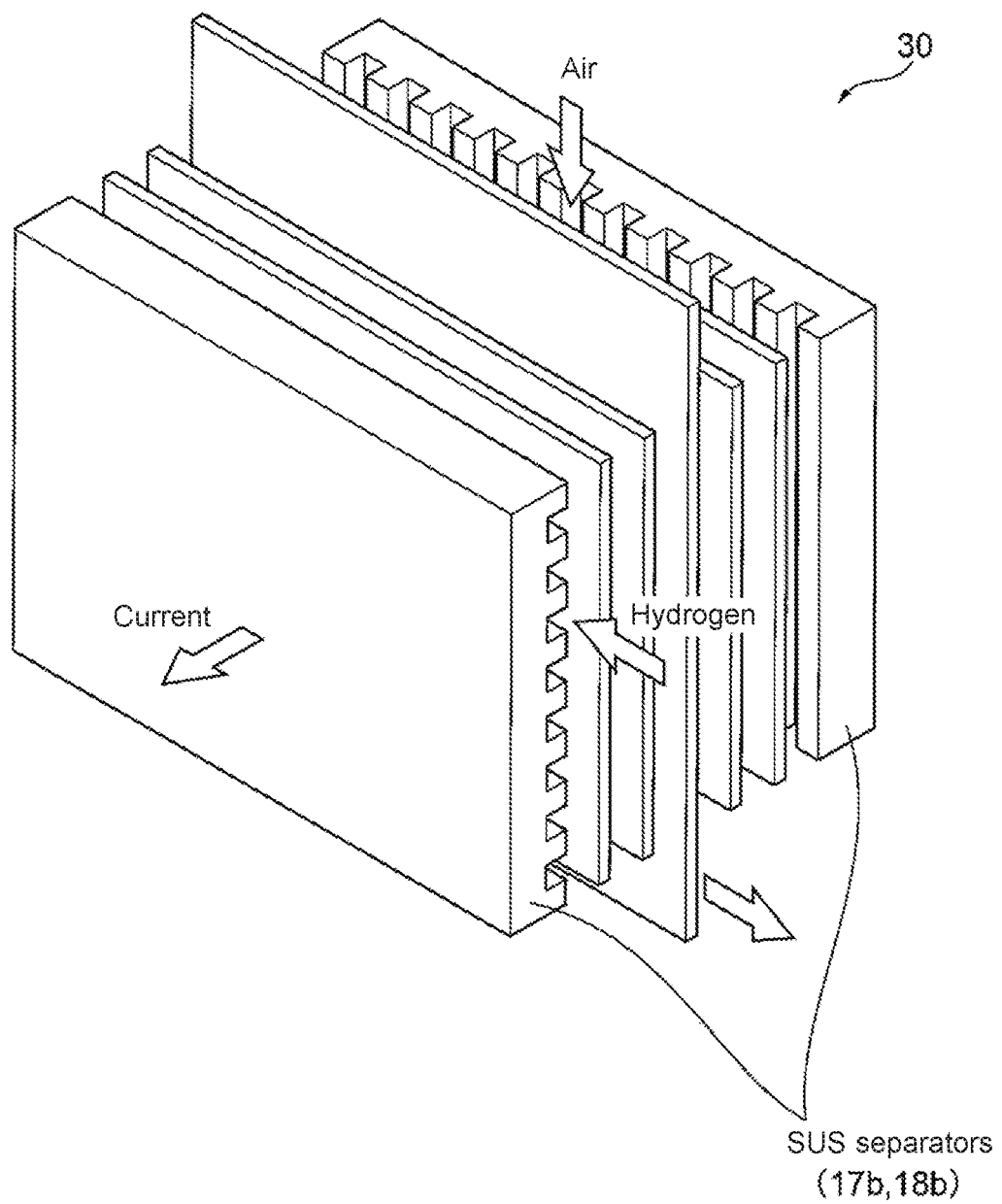
FIG. 5 is a schematic perspective view illustrating the configuration of each cell other than the end cell.

More specifically, the base material of each of the separators used for the end cells 20 is a material with higher corrosion resistance than the base material of each of the separators used for the cells 30 other than the end cells. For example, the separators 17a and 18a of the end cells 20 are separators made of Ti as illustrated in FIG. 4, and the separators 17b and 18b of the cells 30 other than the end cells are separators made of SUS as illustrated in FIG. 5.

In such a case, a passivation film of $TiO_2$ is formed on the surface of each of the Ti separators 17a and 18a of the end cells 20 so that the separators have more excellent corrosion resistance than the SUS separators 17b and 18b of the other cells 30. The passivation film on the Ti surface is formed naturally when Ti is left in the atmosphere, and thus no special measures for forming a passivation film are required. Therefore, using Ti as the base material of each of the separators used for the end cells 20 is quite advantageous. As a material of the same type, Sn or Ta can also be used.

Figure 6:
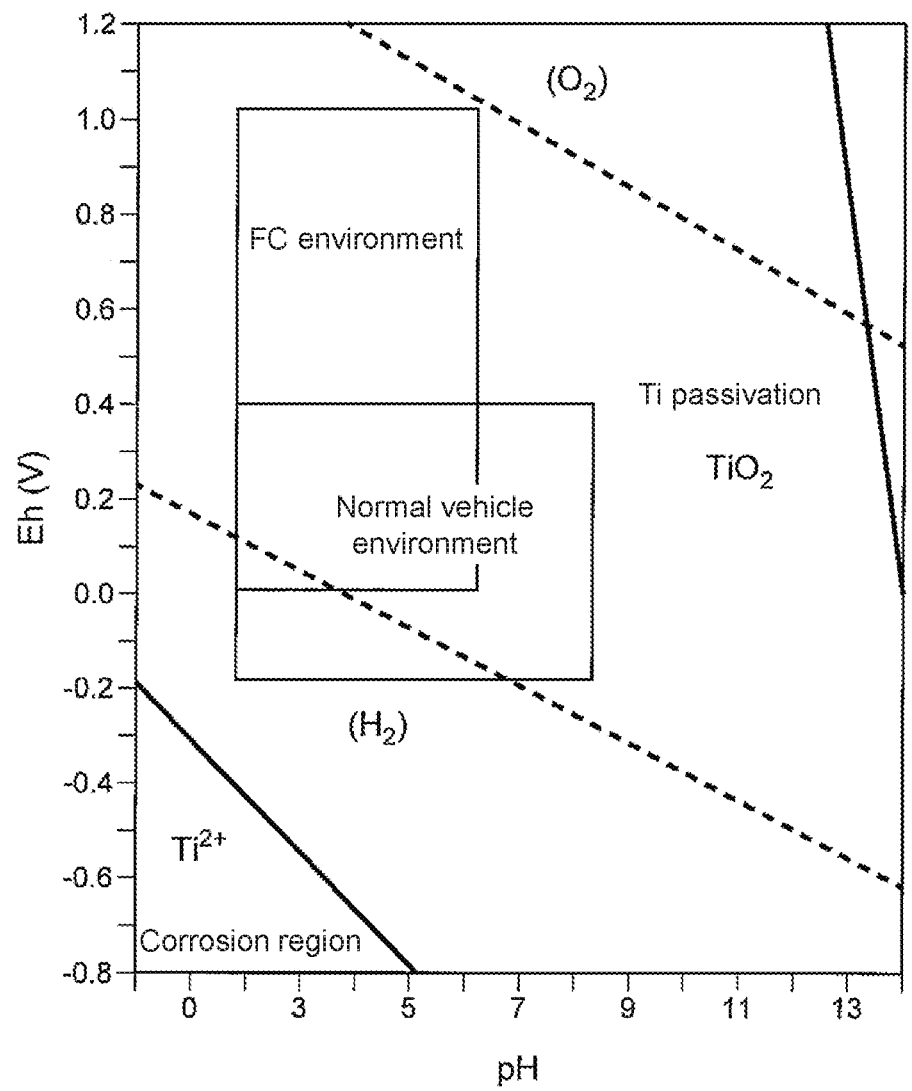
FIG. 6 is a potential vs. pH chart of Ti.

FIG. 6 is a potential vs. pH chart of Ti. As illustrated in FIG. 6, a passivation film ($TiO_2$) is formed in the normal operating environment of the fuel cells indicated by the "FC environment," whereby Ti can be kept in a stable state even when Eh is 1.0 V, and therefore, it is found that using Ti for the separators of the end cells 20 is effective.

Even when a passivation film is not provided, noble metal, such as Au, Pt, or Ag may be used as the base material of each of the separators of the end cells that has more excellent corrosion resistance than that of SUS. However, using such materials is disadvantageous in that it requires a higher cost than using Ti.

As described above, as the separators of the end cells 20 are formed using a material that is less likely to corrode (dissolve), the end cells 20 will consume a current, and thus a corrosion current flowing through the cells 30, which are formed using a low-cost material (for example, SUS), other than the end cells is suppressed. Accordingly, the possibility of corrosion that may occur in the separators of the cells 30 other than the end cells can be reliably suppressed.

When a material having a passivation film formed on its surface, such as Ti, is used as the base material of each of the separators of the end cells 20, it would be more preferable to form a surface protective layer capable of further enhancing the corrosion resistance on the surface of the passivation film. Specifically, as the surface protective layer, a plated layer of NiSn or Au can be used. In such a case, the surface protective layer supports the current consumption, so that the number of cells whose separators are formed using a base material with higher corrosion resistance than that of the base material of each of the separators used for the other cells 30, that is, the number of the end cells can be reduced.

In addition, when a material having a passivation film formed on its surface, such as Ti, is used for each of the separators 17a and 18a of the end cells, expected performance can be achieved even when the aforementioned surface protective layer has a thickness in the range of 5 nm to 500 nm. Even when noble metal such as Au is used as the material of the surface protective layer, a thickness in the range of 5 nm to 500 nm would be sufficient, and thus a lower cost can be achieved in comparison with when the conventional end cell that requires a surface protective layer with a thickness on the order of $\mu$m is used as described in JP 2005-293876 A, for example. In addition, since the surface protective layer is thin, there will be no particular adverse effect on the body of the separator even when the surface protective layer, which is a plated layer, has defects in plating, which is advantageous.

In the fuel cell stack 100 in accordance with the present disclosure, a certain degree of advantageous effects can be achieved even when the end cell 20 is a single cell on the positive-side end of the fuel cell stack. More preferably, separators of more than one cell counted from the positive-side end are desirably formed using a material with high corrosion resistance. How many cells are to be specifically included in the end cell can be effectively determined by creating graphs of a corrosion current and a potential such as those illustrated in FIGS. 2B and 2C, respectively, through simulations or experiments and selecting the number of cells in which a current or a potential of greater than a predetermined value (for example, greater than or equal to 1 V) is predicted to be generated. According to the experiments of the inventors, it has been found that forming separators of about 2 to 5 cells counted from the outermost end on the positive side, using a material with higher corrosion resistance than those of the separators of the other cells is practical and effective both in cost and productivity.

In the fuel cell stack in accordance with the present disclosure, the end cell (or a cell located at the outermost end on the positive side when the end cell includes a plurality of cells) 20 can be prepared as a dummy cell without a power generation function like the one described in JP 2015-69737 A. However, using such a dummy cell without a power generation function would decrease the proportion of the amount of power generation to the total volume of the fuel cell stack. In addition, in the fuel cell stack in accordance with the present disclosure, a voltage drop during power generation can be suppressed by a certain degree by using, for the end cells 20, separators made of a material with higher corrosion resistance than that of the separators of the cells 30 other than the end cells. Therefore, in the fuel cell stack 100 in accordance with the present disclosure, there will be no inconvenience even when all of the cells 10 are formed as cells that contribute to power generation (that is, cells each including a membrane electrode assembly), and consequently, sufficient power can be obtained even when the size of the fuel cell stack 100 is reduced.

Next, the results of simulation of a potential in each cell of the fuel cell stack when SUS separators were adopted for all of 370 cells and when separators of 4 cells at the positive-side end out of 370 cells were replaced with separators each formed by plating a Ti base material with NiSn with a thickness of 500 nm will be described with reference to FIG. 7.

Figure 7A:
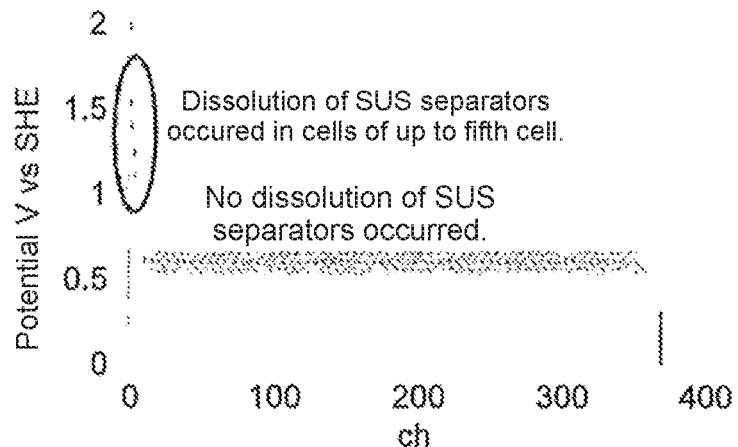
FIGS. 7A and 7B are views of the results of simulation each illustrating the degree of corrosion of a separator.
Figure 7B:
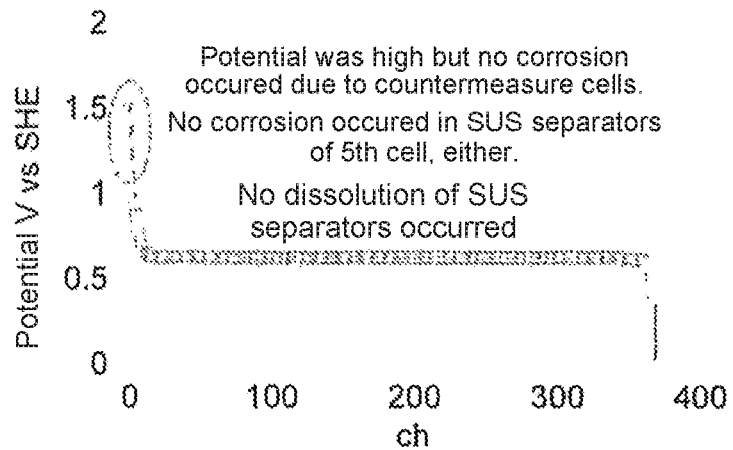

FIG. 7A illustrates a case where SUS separators were adopted for all of the cells. It has been found that when the separators were held at a voltage applied to the respective cells for a given period of time, the potentials at the cells of up to the fifth cell from the end became high potentials of above 1 V, and thus the SUS separators of the cells of up to the fifth cell dissolved. Meanwhile, FIG. 7B illustrates the results when separators of 4 cells at the positive-side end were replaced with separators each formed by plating a Ti base material with NiSn, and shows that the separators of the cells of up to 4 cells from the end did not corrode even at high potentials, and further, the SUS separators of the fifth cell did not corrode, either.

Figure 8:
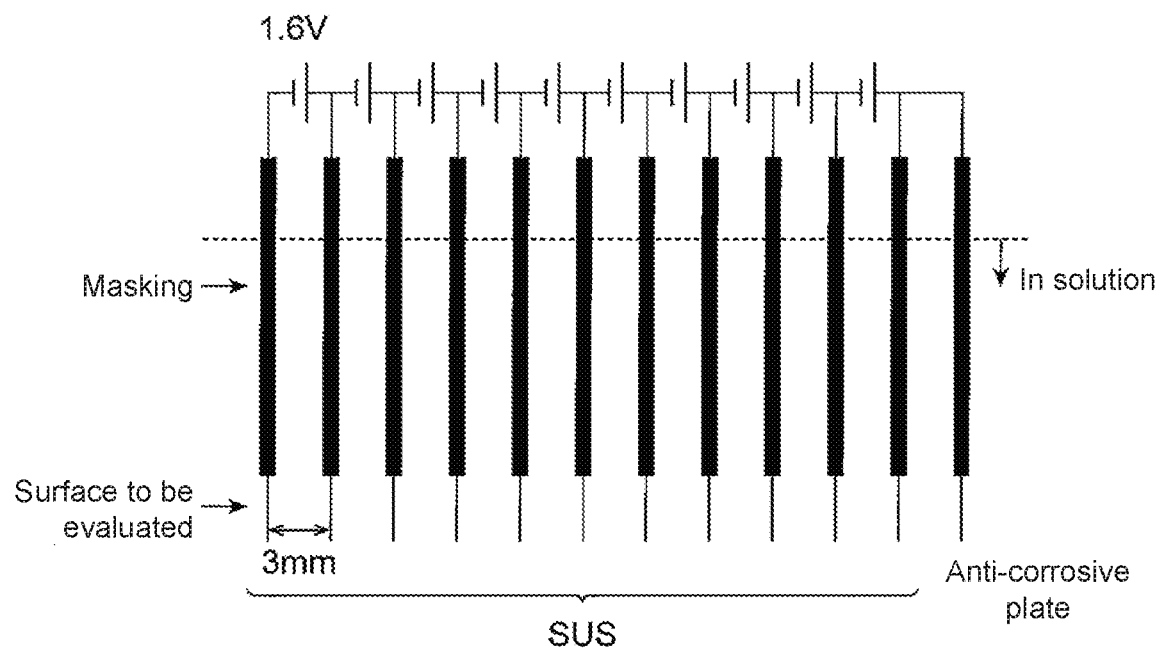
FIG. 8 is a cross-sectional view illustrating the configuration of a simulated cell.
Figure 9:
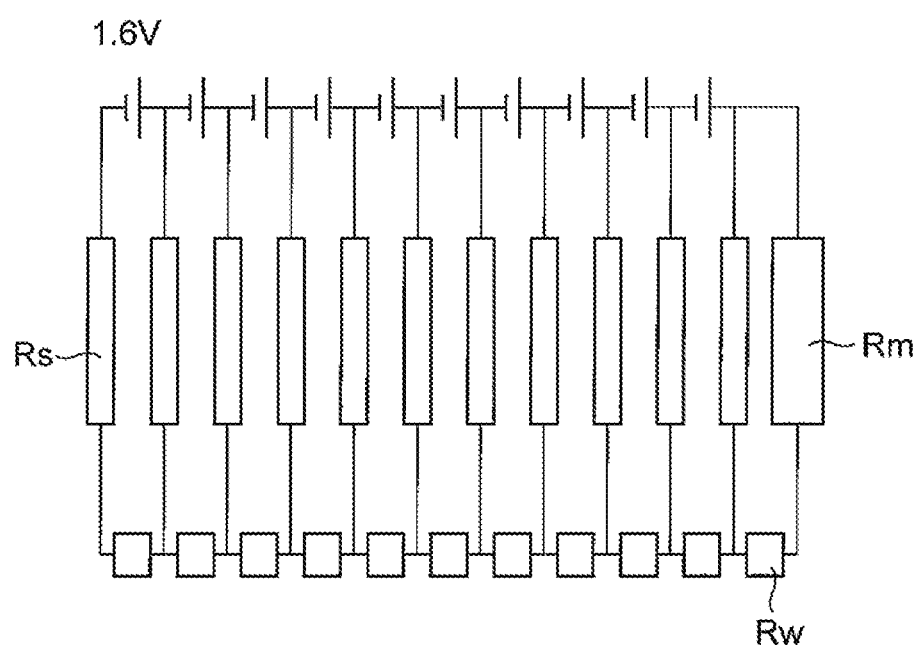
FIG. 9 is a circuit diagram of a simulated cell.

Next, corrosion tests conducted by the inventors using simulated cells that utilize dry cells will be described with reference to FIGS. 8 and 9. FIG. 8 is a cross-sectional view of tested simulated cells in which 10 dry cells of 1.6 V were arranged in series. An anti-corrosive plate (a non-power-generating Au plated plate) was arranged on the outer side of the simulated cell on the positive side with a view to provide a dummy cell. Separator materials of SUS were disposed with a distance of 3 mm therebetween, which were then immersed in cooling water. The central portion of each separator material was masked with silicone, and the lower end portion below the masked portion was used as a surface to be evaluated. FIG. 9 is a circuit diagram of the simulated cells in which Rs represents the metal resistance of the separator material, Rm represents the metal resistance of the anti-corrosive plate, and Rw represents the resistance of cooling water.

[Test 1]

When all of the ten separators were made of SUS, corrosion was observed in the separators of three simulated cells of from the positive-side end out of the 10 separators after 26 hour(s) have elapsed in the experiment.

[Test 2]

The separators of the three simulated cells having corrosion generated therein were simply replaced with Ti and an experiment was conducted similarly. Then, no corrosion occurred in the separators of the three simulated cells. However, corrosion was observed in the separators of the fourth simulated cell of from the positive-side end.

[Test 3]

An experiment was similarly conducted by replacing the separators of the three simulated cells having corrosion generated therein with separators each obtained by plating Ti with NiSn with a thickness of 500 nm. Then, no corrosion occurred in the separators of the three simulated cells. Further, no corrosion was observed in the separators of the fourth and following simulated cells of from the positive-side end, either.

[Test 4]

A corrosion test was conducted as in Test 3 by replacing a Ti separator plated with NiSn with a thickness of 500 nm with a Ti separator plated with Au with a thickness of 10 nm. In such a case also, no corrosion occurred in the separators of the three simulated cells. Further, no corrosion was observed in the separators of the fourth and following simulated cells of from the positive-side end, either.

[Consideration]

From the aforementioned experimental results, it is found that when Ti is simply used as the base material of each of the separators of the end cells, and when a separator obtained by forming a surface protective layer capable of further enhancing the corrosion resistance on the surface of Ti is used, the degree of corrosion of the separator can be enhanced in comparison with when all of the separators are made of SUS.

DESCRIPTION OF SYMBOLS

100 Fuel cell stack
10 Power-generating cell
11 Membrane electrode assembly
12, 13 Catalyst layers
14 Membrane electrode assembly
15, 16 Diffusion layers
17, 18 Separators
17a, 18a Ti separators
17b, 18b SUS separators
20 End cell
30 Cells other than end cell
41 Terminal plate
42 Insulating plate
43 End plate

What is claimed is:

1. A fuel cell stack comprising a plurality of stacked cells each having separators,
wherein:
a base material of each of separators used for an end cell located at a positive-side end of the fuel cell stack and a base material of each of separators used for cells other than the end cell are different metallic materials, and
the base material of each of the separators used for the end cell is a material with higher corrosion resistance than the base material of each of the separators used for the cells other than the end cell.

2. The fuel cell stack according to claim 1, wherein the end cell includes one or more cells.

3. The fuel cell stack according to claim 1, wherein all of the cells are cells that contribute to power generation.

4. The fuel cell stack according to claim 1, wherein a surface of the base material of each of the separators used for the end cell has a passivation film formed thereon.

5. The fuel cell stack according to claim 4, wherein a surface of the passivation film has formed thereon a surface protective layer having a thickness in a range of 5 nm to 500 nm and capable of further enhancing corrosion resistance.

6. The fuel cell stack according to claim 5, wherein the surface protective layer is a plated layer of NiSn or Au.

7. The fuel cell stack according to claim 4, wherein the base material of each of the separators used for the end cell is one selected from the group consisting of Ti, Sn, and Ta.

* * * * *